United States Patent [19]

Altenburg

[11] Patent Number: 5,682,706
[45] Date of Patent: Nov. 4, 1997

[54] FLYING INSECT TRAP

[76] Inventor: Charles Altenburg, 6332 Arlington Ave., Las Vegas, Nev. 89107

[21] Appl. No.: 557,854

[22] Filed: Nov. 14, 1995

[51] Int. Cl.⁶ ............................................. A01M 1/10
[52] U.S. Cl. ....................................... 43/122; 43/107
[58] Field of Search ........................... 43/107, 122, 121, 43/65

[56] References Cited

U.S. PATENT DOCUMENTS

| | | | |
|---|---|---|---|
| 2,162,502 | 6/1939 | Goulard | 43/107 |
| 2,715,295 | 8/1955 | Brown | 43/107 |
| 2,809,465 | 10/1957 | Guinotte | 43/122 |
| 4,218,842 | 8/1980 | Anderson | 43/122 |
| 4,476,647 | 10/1984 | Hall | 43/122 |
| 4,571,880 | 2/1986 | Hayward | 43/122 |
| 4,638,592 | 1/1987 | Schneidmiller | 43/122 |
| 5,081,788 | 1/1992 | Dowd et al. | 43/107 |
| 5,133,150 | 7/1992 | Briese | 43/122 |
| 5,392,558 | 2/1995 | Blomquist | 43/107 |

FOREIGN PATENT DOCUMENTS

| | | | |
|---|---|---|---|
| 35134 | 11/1990 | Australia | 43/107 |
| 2924629 | 1/1981 | Germany | 43/107 |
| 365231 | 1/1932 | United Kingdom | 43/107 |

*Primary Examiner*—Jeanne Elpel
*Attorney, Agent, or Firm*—Thorpe, North & Western

[57] ABSTRACT

A flying insect trap consists of a housing having a plurality of channels, wherein each channel has a horizontal portion and a vertical portion. The channels are typically formed by a center wall which divides the housing into generally equal portions, thereby forming the channels. In accordance with one aspect of the invention, the center/common wall is continuous and generally vertical so that insects contacting the wall will fall into the generally vertical portion of the channel. The housing nests with a container which is used to store bait and to capture the flying insects once they have passed through the housing.

15 Claims, 5 Drawing Sheets

FLYING INSECT TRAP

BACKGROUND OF THE INVENTION

The present invention relates to an insect trap, and more particularly, to a novel trap for catching flying insects within a disposable container.

The use of traps to eliminate insects is well known in many segments. The traps may be used to protect fruits, vegetables and other foodstuffs from being eaten or contaminated by the insects. Likewise, the traps may be used to eliminate insects from within a building. Perhaps the most common use of insect traps, however, are those used outside of dwellings to eliminate or minimize the number of flying insects which may interfere with enjoyment of the area.

To accomplish this purpose, there are numerous different types of traps. One popular trap is formed of an elongate strip of paper or some other material. A scent is applied and the paper is covered with a sticky, glue-like substance. When the flying insect lands on the paper, the glue-like substance prevents the insect from escaping and the insect eventually dies.

While such a trap is economical, there are disadvantages. First, the sight of numerous dead insects along a piece of paper is generally unappealing. Second, people occasionally bump into the piece of paper and contact both the insects and the glue-like substance.

Another popular flying insect trap is a device which has a bright light to attract flying insects. An electrified metal grate is disposed about the light. As the insect flies toward the light, it contacts the electrified metal grate. The insect is then electrocuted and causes no additional disturbance to those using the outdoors adjacent the trap.

Such traps, however, have several disadvantages. First, the devices are relatively expensive. Second, the devices require electricity to power the light and to electrify the metal grate. Third, the sound of the device can become annoying to many. As the electricity from the metal grate electrocutes the flying insect, a distinctive zapping sound is heard. If numerous flying insects are caught in the trap, the repeated sound can become tiresome, and can interfere with conversations of those near the trap.

Another type of solution is a trap which is of considerably less complexity, and in many instances, of greater usefulness. The trap has a container, such as a jar, into which meat, spoiled fruit or some other bait is placed. A cover/trap is then placed on the jar. The cover has several apertures disposed therein. The apertures are disposed to effect two purposes. First, the apertures allow the scent of the bait to diffuse into the surrounding area. As the scent spreads, insects are attracted to the cover. The scent leads the insects through the apertures formed in the cover and to the bait within the jar. Once in the jar the insects are effectively trapped. This is accomplished by coloring the cover black, limiting light flow through the apertures and using a transparent or translucent jar to hold the bait. Because most insects will seek light, the vast majority of the insects inside the jar will never find their way out. Rather, they will repeatedly fly into the wall of the jar until they finally collapse and die. When the jar is full of insects, the cover is removed, the insects dumped into the garbage, the jar is washed and the cover reattached for subsequent use.

While such traps work relatively well, it has been found that a different configuration of the cover/trap can substantially improve the effectiveness of the trap. Furthermore, the changed configurations allow the cover to be used with empty household food containers which would typically be thrown away. Thus, once the container is full of insects, it may be disposed of, rather than rinsed and reused.

SUMMARY OF THE INVENTION

Thus, it is an object of the present invention to provide an insect trap which is inexpensive and easy to use.

It is another object of the invention to provide such an insect trap which is effective in capturing and retaining insects.

It is another object of the invention to improve directional distribution of the bait scent within an area of use.

The above and other objects of the invention are realized in specific illustrated embodiments of a flying insect trap including a cover having a plurality of channels formed therein so as to allow a bait scent to exit through the channels formed in the cover, and so as to allow insects to enter the trap through the channels. Unlike the traps of the prior art, the cover of the present invention has continuous channels having a generally horizontal portion and a generally vertical portion which leads from outside of the cover, into a jar or other container in which the bait is placed.

In accordance with one aspect of the invention, the cover consists of two channels having a common wall between them. The channels are disposed so as to maximize air flow into one channel and out of the other channel so as to attract a greater number of insects.

In accordance with another aspect of the invention, the channels are disposed so that a baffle or common wall defining an end of the generally horizontal portion and the backside of the generally vertical portion of the channel extends generally vertically down to an opening at a bottom of the trap to thereby direct flying insects into the container.

In accordance with another aspect of the invention, the opening of the channel of the generally horizontal portion is narrower than the remainder of the generally horizontal portion of the channel so as to limit light present in the channel.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1A:
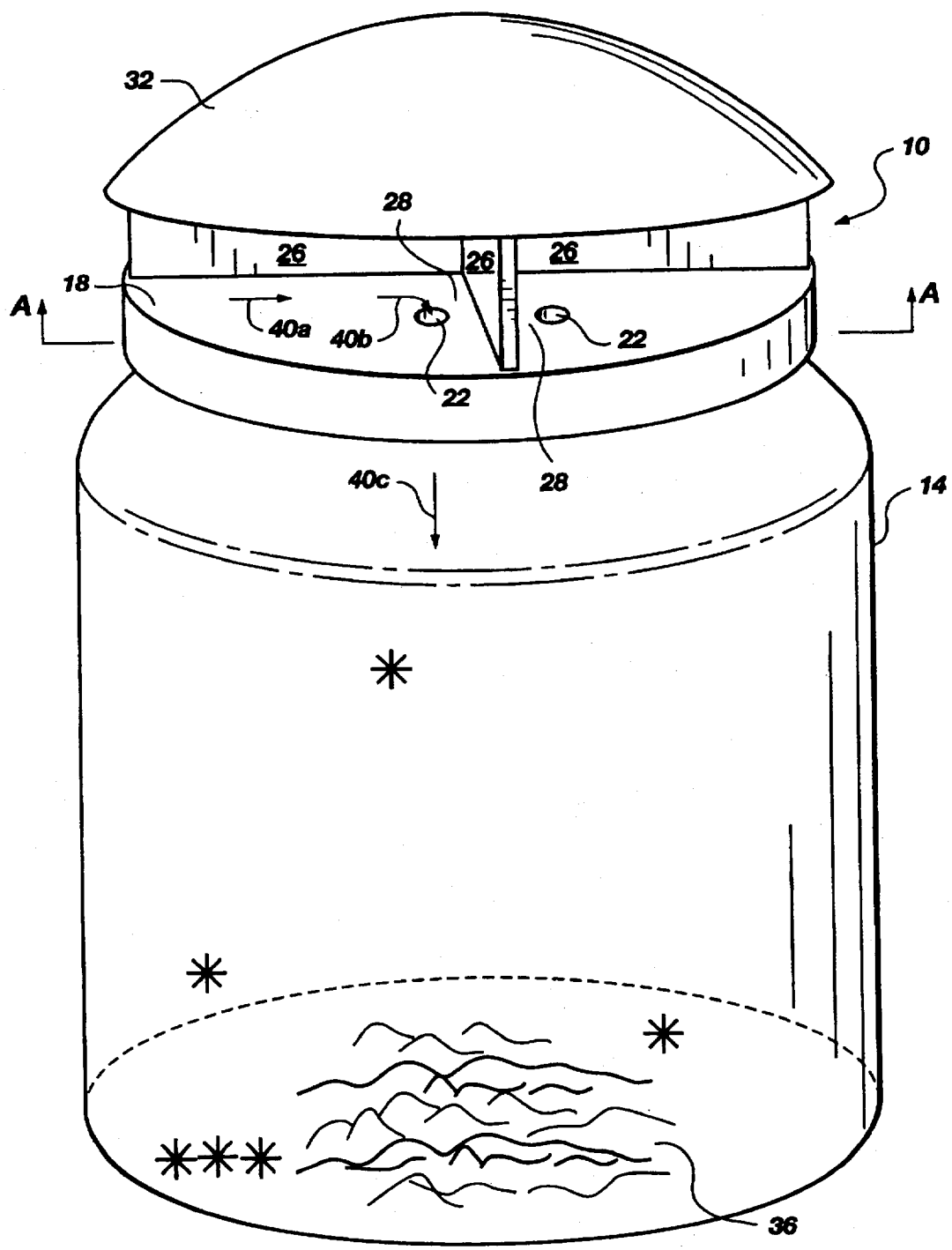
FIG. 1A shows a perspective view of a flying insect trap of the prior art.

Referring to FIG. 1A, there is shown a perspective view of a flying insect trap, generally indicated at 10, of the prior art. The trap 10 is attached to a jar 14 which is made of a transparent or translucent material. The trap 10 has a generally planar surface 18 with a plurality of apertures 22 formed therein. The apertures 22 are separated from one another by a plurality of walls 26. The position of the walls 26 relative to the apertures 22 leaves a ledge 28 around each aperture.

The walls 26 and apertures 22 are covered by a cap 32 which is generally dome shaped. As will be explained in detail below, the dome shaped cap is used primarily to prevent sunlight from shining through the apertures 22, although it also prevents rain from entering the jar and does help to keep flying insects adjacent to the apertures.

In use, fruit, meat, or some other bait 36 is placed in the jar. A scent of the bait 36 will gradually diffuse out of the apertures 22 and attract flying insects toward the trap 10. As they follow the smell, the insects will generally follow the path designated by arrows 40a, 40b and 40c. Once the insect is in the jar 14, the insect will generally be unable to find its way out of the trap 10. This is primarily because most insects search for light. It is for this reason that electrified traps use a light to draw the insect into the electrified grate.

To avoid the risk that insects will fly out of the apertures 22, the trap 10, including the surface 18, the insides of the apertures, the walls 26 and the underside of the cap 32 are painted black or some other very dark color. Because little or no light comes through the apertures, the insect does not try to fly out of the holes. Rather, the insect will repeatedly fly into the sides of the jar until it collapses and dies.

Figure 1B:
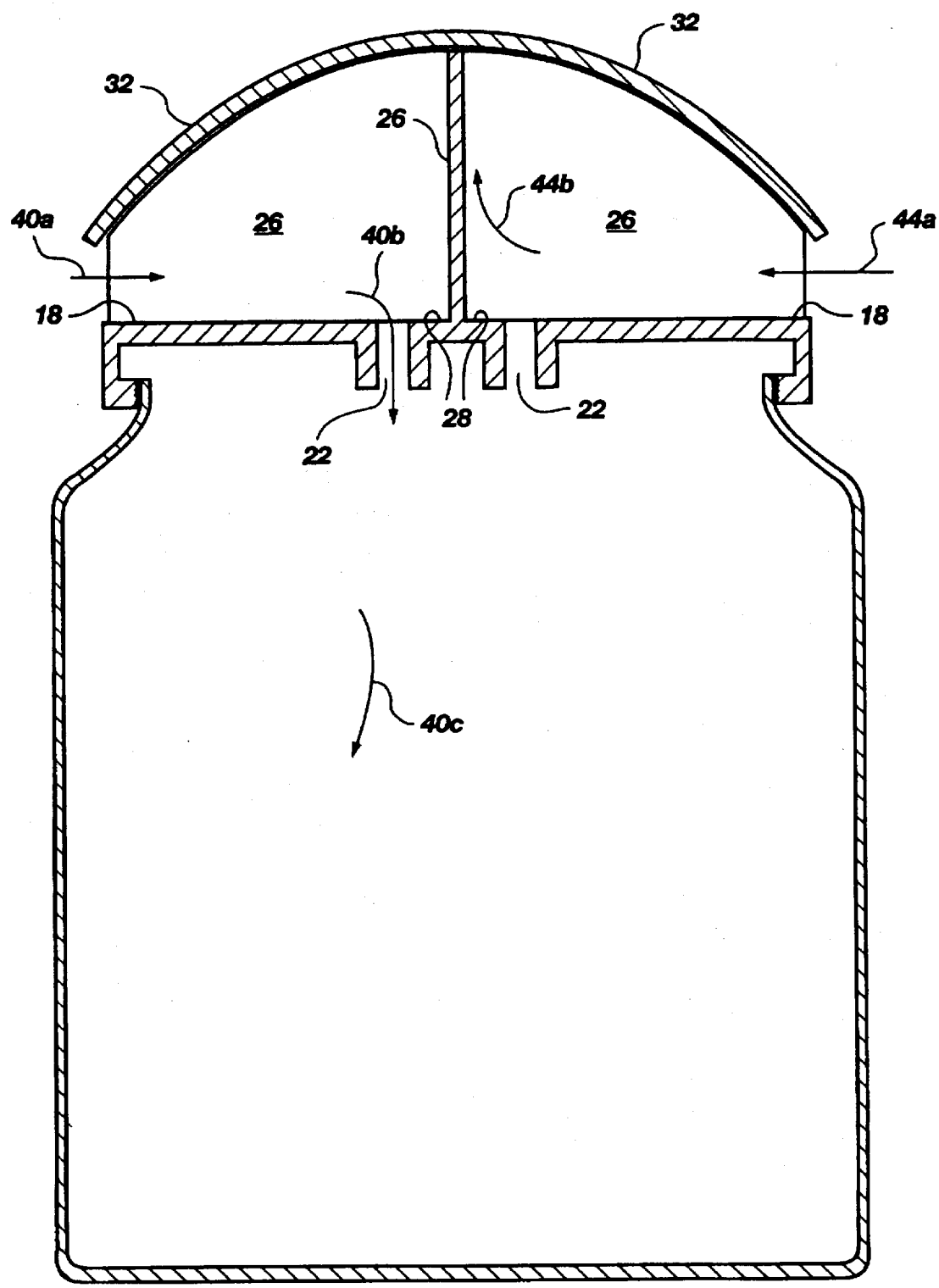
FIG. 1B shows a side cross-sectional view of the flying insect trap of FIG. 1A.

Referring now to FIG. 1B, there is shown a side cross-sectional view of the flying insect trap 10 shown in FIG. 1A. The trap 10 includes the generally planar surface 18, the apertures 22, walls 26 ledges 28 and cap 32 discussed in FIG. 1A. This arrangement presents several problems. First, the arrangement described limits air flow through the trap 10. Because the bait 36 (FIG. 1A) is placed within the jar 14, limitation on airflow through the trap 10 significantly limits the dissipation of the scent, and thus limits the range in which flying insects will be attracted.

Because of the arrangement of the trap 10 shown in FIG. 1B, little air travels through the apertures 22. For example, if a breeze blows into the trap 10, as represented by arrow 44a, little air will be channeled into the jar 14. Rather, most of the air will follow the path represented by arrow 44b. By limiting air flow through the jar 14, the effective range of the flying insect trap is decreased. This is especially true in that the diffusion which is required to move the scent provides little directional sense to the insect receiving the scent.

Another problem with such an arrangement is that the insect is not channeled into the aperture 22. If an insect is flying sufficiently fast to contact the wall 26, is will fall on to the ledge 28, rather than down through the aperture 22. The insect may they then seek light and fly out of the trap, rather than into the jar 14.

Figure 2:
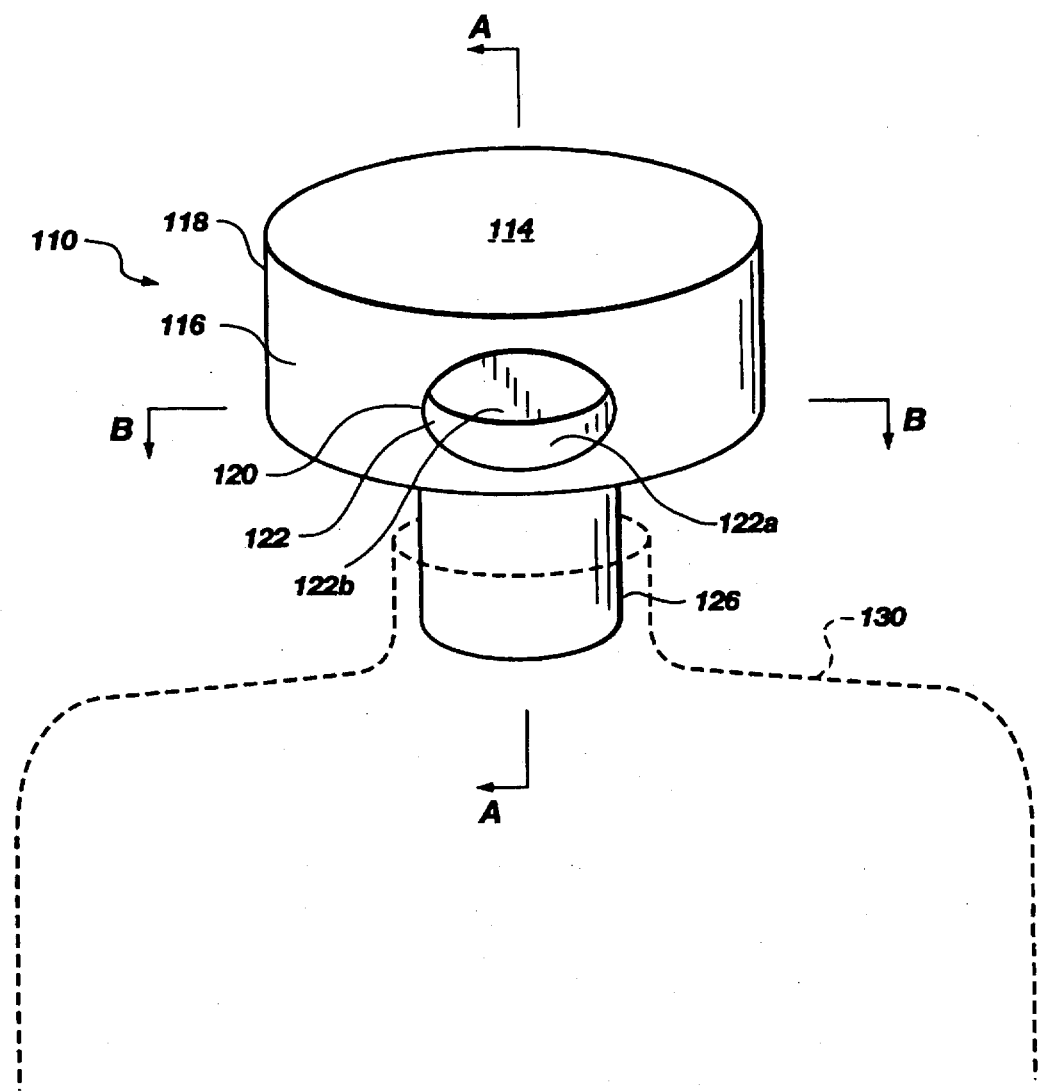
FIG. 2 shows a perspective view of the flying insect trap of the present invention.

Referring now to FIG. 2, there is shown a perspective view of the present invention. The trap, generally indicated at 110, has a housing 114 formed of a first, larger cylinder 116 and a second, smaller cylinder 126.

Disposed in a side wall 118 of the first cylinder 116 are a plurality of openings 120, one of which is shown in FIG. 2. The opening 120 begins a channel 122 with an elongate, generally horizontal portion 122a (generally disposed in the first cylinder) and an elongate generally vertical portion 122b which extends downwardly from the generally horizontal portion. The generally vertical portion 122b of the channel 122 is disposed in the second cylinder 126 which extends downwardly from the first cylinder 116 to form a neck. Typically, the circumference of the neck 126 is slightly smaller than the outer circumference of an opening of a container, such as a milk jug, represented by the dashed lines 130.

As will be explained with respect to FIGS. 3 through 5, the embodiments of the present invention both increase air flow through the trap 110, thereby increasing the effective range of the trap, and assist in directing the flying insect into the container.

Figure 3:
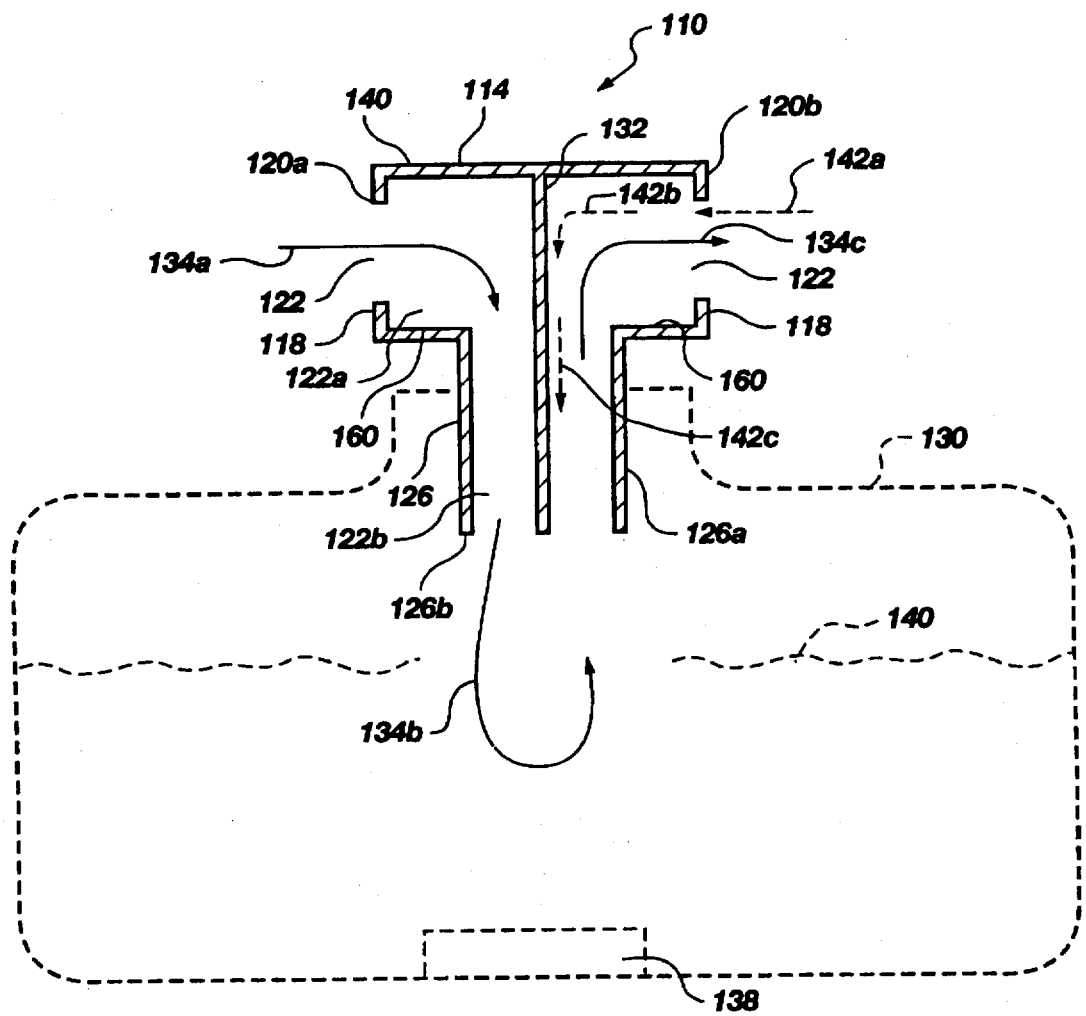
FIG. 3 shows a side cross-sectional view of the embodiment of the invention shown in FIG. 2.

Referring now to FIG. 3, there is shown a side cross-sectional view of the taken along the plane A in FIG. 2. The trap 110 includes a housing 114 which forms two channels 122. Each of the channels has a generally horizontal portion 122a and a generally vertical portion 122b. The two channels 122 are separated by a baffle or common wall 132. As with the prior art, the portions of the housing 114 forming the channels 122 are generally black, or some other very dark color, so as to limit the transmission of light through the channels 122 and thereby prevent the insects from finding their way out of the container 130.

The present arrangement has several advantages over the prior art. First, the channels having a horizontal portion 122a and a vertical portion 122b significantly improves the flow of air into and out of the container 130. As is shown by arrows 134a, 134b and 134c, when a breeze blows into an opening, such as opening 120a, the air is directed from the horizontal portion 122a of the channel 122 to the vertical portion 122b by the baffle/wall 132. The air then passes into the container 130, as represented by arrow 134b, and picks up the scent of the bait 138 in the container. The air then flows up the vertical portion 122b of the other channel 122 as represented by arrow 134c, and is directed out of the opening 120b. In such a manner, significantly more scent is released into the area adjacent the flying insect trap 110, and the likelihood that flying insects will be captured is increased. Additionally, the scent carried by the air provides better directional sense to the insect than does a scent which is simply transported by diffusion, as in the prior art.

The horizontal portion 122a of each channel is formed by a top wall 140, the side wall 118 and a bottom wall which is formed by a flange 160 extending inwardly from the side wall and outwardly from the neck 126. When the neck 126 is nested in a container, the flange 160 seals the opening to prevent insects from climbing out. The housing 114 will typically balance on even a container with a narrow opening, as the first cylinder 116 and the second cylinder/neck 126 are disposed generally coaxially.

The generally vertical portions are formed by a sidewall 126a which forms the second cylinder/neck 126 and by the baffle/wall 132. The generally vertical portions 122b terminate at the opening 126b in the end of the second cylinder/neck 126 opposite the first cylinder 116.

Another advantage of the present invention is the lack of a ledge, such as ledge 28 adjacent the wall 26 (FIG. 1). If an insect flies into the wall 132 while following the scent of the bait 138, as represented by dashed arrows 142a and 142b, the insect will drop into the container and will not have a second chance to escape the trap 110 as described above.

Often, however, the insects will usually land on the outer ledge/bottom wall 160 and then follow the scent of the food through the generally vertical portion 122b. The wall 118 limits the light which may distract the insect and cause the insect to fly away.

In addition to the placing bait 138 in the container 130, the container may be filled with water 140 or some other fluid. Any insects flying into the container 130 will land in the water and drown. Typically, the water will fill between ⅔ and ¾ of the container.

Figure 4:
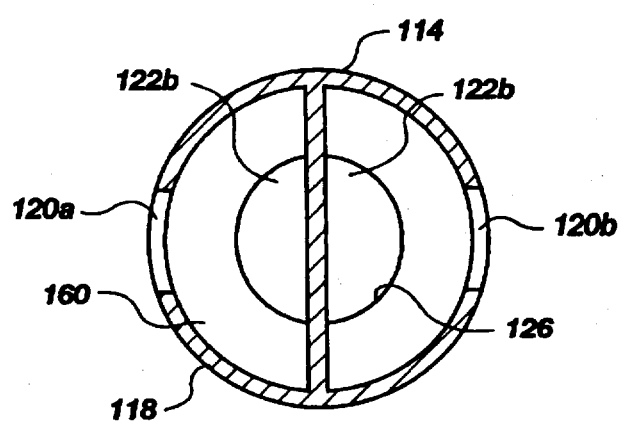
FIG. 4 shows a cross-sectional view of the embodiment of the invention shown in FIGS. 2 and 3.

Referring now to FIG. 4, there is shown a cross-sectional view looking down through the vertical portions 122b of the channels 122. The housing 114 has the side wall 118 into which the openings 120a and 120b are formed. As will be appreciated, the side wall 118 provides an opening 120a or 120b which is of a narrower cross-sectional are a than the channel 122 into which it opens. In such an arrangement, the insect's ability to see light is limited by the radial extension of the side wall 118 which is typically made of black plastic, or otherwise darkened. If the flying insect impacts the center wall 132 sufficiently hard that it bounces back to an outer ledge, i.e. the flange 160, it must turn to see the light entering through the opening 120a or 120b. If the insect remains facing the center wall 132, it will see the light coming into the channel 122 from the vertical portion 122b, and will follow the vertical portion into the container 130. Thus, the present invention renders it more likely that the insect will become trapped in the container.

While the side wall 118 of the housing 114 is darkened on the inside to prevent the insect from following light, it will typically be painted a bright color, such as white, or yellow, on the outside to further attract flying insects. For convenience, it is anticipated that the entire housing 114 will be formed of plastic or some other moldable material. Typically, the plastic will be black, so that only the outside of the side wall 118 need be painted or otherwise colored. However, numerous different methods of coloring respective parts will be apparent to those skilled in the art.

As was mentioned previously, the neck is sufficiently narrow to nest in the opening of a container, such as a milk bottle. The prior art flying insect traps taught to empty the jar and then wash and reuse the same. The present invention, however, allows the user to fill a container with dead insects and then dispose of the container rather than risking contact with insects which might can disease. Because the container, e.g. an empty milk jug, would have been disposed of anyway, no additional refuse is created and the user is relieved of the unwanted task of cleaning out a container full of dead insects.

Figure 5:
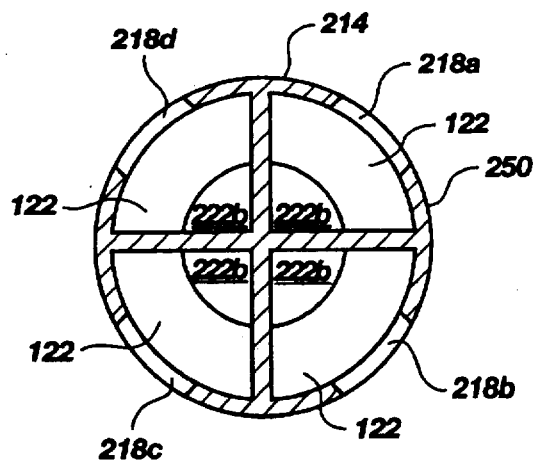
FIG. 5 shows a cross-sectional view similar to that shown in FIG. 4, but of another embodiment of the teaching of the present invention.

Referring now to FIG. 5, there is shown a cross-sectional view of an alternate embodiment of the present invention, similar to that shown in FIG. 4. The primary difference between the embodiment shown in FIG. 4 and that shown in FIG. 5 is that the housing 214 is divided into separate channels 222. When an insect flies into any of the openings 218a, 218b, 218c or 218d in the outer wall 250, the insect is directed down the respective channel in the manner as described above. Functionally, the primary difference between the embodiments is that a breeze will cause air to flow into one or two of the channels 222, and air out of the container (not shown) will pass out of two or three of the channels. In light of the present disclosure, those skilled in the art will appreciate that such a dispersement pattern will decrease the linear range at which the bait (not shown) may be smelled by the insect, but will increase saturation of a smaller area, as scent will spread more evenly.

Figure 6:
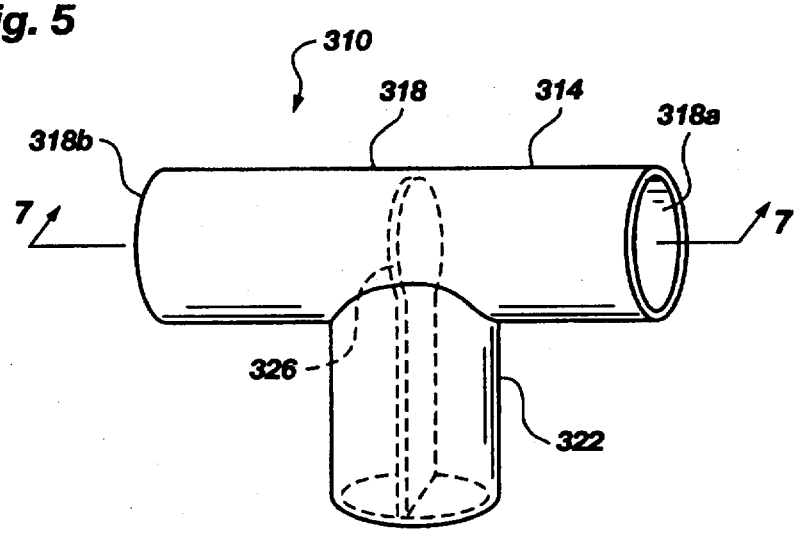
FIG. 6 shows a perspective view of another embodiment of a flying insect trap made in accordance with the teachings of the present invention.
Figure 7:
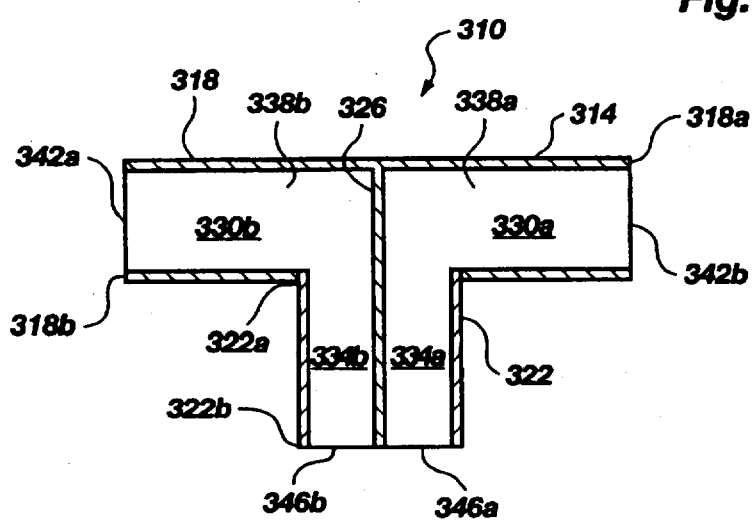
FIG. 7 shows a cross-sectional view of the embodiment shown in FIG. 6.

Referring now to FIGS. 6 and 7, there is shown a perspective view and a cross-sectional view, resectively, of another embodiment of a flying insect trap, generally indicated at 310, made in accordance with the teachings of the present invention. The insect trap includes a housing 314 formed by a generally horizontally disposed tube, formed as an elongate cylinder 318, and a generally vertical disposed tube, formed as an elongate cylinder 322.

The generally horizontally disposed cylinder 318 is generally hollow and open at a first end 318a and second end 318b. A baffle or wall is disposed in the generally horizontal cylinder 318 so as to divide the hollow into two horizontal channels 330a and 330b respectively.

Like the generally horizontal cylinder 318, the generally vertical cylinder 322 has openings at a first end 322a and a second end 322b. The opening at the first end 322a, however, opens into the hollow generally horizontal cylinder 318 adjacent the wall 326. Typically, the wall 326 will extend downwardly into the generally vertical cylinder 322 so as to bisect the hollow of the generally vertical cylinder into two generally vertical channels 334a and 334b, respectively.

Because of the location of the generally vertical cylinder 322 and the baffle or wall 326, each of generally vertical channels 334a and 334b are in communication with one of the generally horizontal channels 330a and 330b, respectively. In such an arrangement, two channels 338a and 338b are formed in which the horizontal channel form a horizontal portion and the vertical channels a vertical portion. Each of the channels has first opening 342a and 342b, respectively, which will typically be disposed outside a collection container (not shown in FIGS. 6 and 7) and a second opening 346a and 346b, respectively, which will be disposed within the container opening. As will be appreciated, the baffle or wall 326 forms both an end wall for each of the horizontal portions 330a and 330b, an a sidewall forming the generally vertical portions 334a and 334b.

Manufacture of the embodiment shown in FIGS. 6 and 7 is easy and inexpensive, as the generally horizontal cylinder 318 and the generally vertical cylinder 322 can be made of pipe which is readily available. For example, a short of PVC pipe, or aluminum pipe could be cut into two pieces. An opening would then be made in the side of one piece and the other piece attached generally perpendicularly so as to form the T-shape shown. The two pieces would then typically be glued or welded together depending on the material used. A piece of plastic or other material could then be inserted to form the baffle or wall 326.

Those skilled in the art will appreciate that the baffle or wall 326 need not be rigid. It must merely be strong enough to deflect a flying insect. However, if rigid wall is preferred, it is suggested that it be positioned in the generally horizontal cylinder prior to attachment of the two cylinders.

Of course, the embodiment described could also be made by injection molding so that the cylinders and dividing wall are formed of a single piece of metal or plastic. The relatively few parts simple angles would make molding a particularly attractive alternative. Additionally, a black plastic could be used so that the interior of the flying insect trap 310 need not be painted.

Thus there is disclosed an improved flying insect trap. Those skilled in the art will be aware of numerous modifications which may be made without departing from the scope and spirit of the invention. For example the embodiments shown could be formed from tubes having square, triangular and other cross-sections. The appended claims are intended to cover such modifications.

What is claimed is:

1. A flying insect trap for attachment to a container for receiving insects, the flying insect trap comprising:
   a housing having:
      at least two channels disposed so as to extend through the housing, each of the channels having a generally horizontal portion and a generally vertical portion in fluid communication with one another, the vertical portions of the at least two channels being disposed on opposing sides of a common wall, and
      a neck portion which extends generally downwardly for nesting in an opening of the container, the neck portion defining at least part of the generally vertical portions of the channels,
      wherein the housing comprises a top wall, a bottom wall formed by a flange extending radially outwardly from the top of the neck portion, and a side wall for connecting the top wall and the bottom wall so as to define the generally horizontal portion of each channel, and
      wherein the housing includes a plurality of openings disposed in the side wall, each opening being in communication with a respective channel so as to form a first opening into that respective channel.

2. The flying insect trap of claim 1, wherein the opening of each channel has a cross-sectional area, wherein the horizontal portion of each channel has a cross-sectional area, and wherein the cross-sectional area of the opening of each channel is smaller than the cross-sectional area of the horizontal portion for the same channel.

3. The flying insect trap of claim 1, wherein the common wall is disposed so as to divide the housing into two separate channels.

4. The flying insect trap of claim 3, wherein the common wall extends vertically through the neck portion so as to divide the neck into at least two channels.

5. The flying insect trap of claim 4, wherein the vertical portion of the channel terminates in an opening at a lower end of the neck portion.

6. A flying insect trap for attachment to a container for receiving insects, the flying insect trap comprising:
   a housing having at least two channels disposed so as to extend through the housing, each of the channels having a generally horizontal portion and a generally vertical portion in fluid communication with one another, the vertical portions of the at least two channels being disposed on opposing sides of a common wall, wherein the housing comprises a generally horizontal tube defining a hollow and having open first and second ends, and a generally vertical tube defining a hollow and attached to the horizontal tube, the vertical tube having an open first end disposed adjacent the hollow of the generally horizontal tube such that the hollows of the first and second tubes are in communication; and the generally vertical tube forming a nesting means for nesting the housing in the container such that each of the channels terminates with an opening into the container.

7. The flying insect trap of claim 6, wherein the common wall is disposed in the generally horizontal tube so as to bisect the hollow of the generally horizontal tube into horizontal portions of the two channels, and disposed in the generally vertical tube so as to bisect the hollow of the generally vertical tube into vertical portions of the two channels, such that each of the horizontal portions is in communication with a respective vertical portion so as to define two channels, each having a horizontal portion and a vertical portion.

8. A flying insect trap for attachment to a container for receiving insects, the flying insect trap comprising:
   a housing including
      a first, generally hollow cylinder with a top wall,
      a side wall with at least two openings formed therein, and
      a flange extending radially inward from a bottom of the side wall;
      a second, generally hollow cylinder attached to the flange so as to be disposed coaxially with the first cylinder and such that hollow portions of the first and second cylinders are in communication; and
      dividing means disposed in the two cylinders for dividing the housing into at least two channels, each of the channels having a generally horizontal portion and a generally vertical portion, each of the generally horizontal portions being in communication with a respective opening in the sidewall of the first, generally hollow cylinder, and wherein the dividing means comprises a common wall disposed such that the channels are disposed on opposing sides of the dividing means.

9. The flying insect trap of claim 8, wherein the common wall comprises a continuous vertical wall.

10. The flying insect trap of claim 8, wherein the first cylinder defines the generally horizontal portion of each channel and the second cylinder defines the generally vertical portion of each channel.

11. The flying insect trap of claim 8, wherein the second cylinder includes at least one opening in an end opposite the first cylinder, and wherein the vertical portions of the channels terminate at said at least one opening.

12. The flying insect trap of claim 11, wherein the housing comprises four channels extending therethrough, each channel comprising a generally horizontal portion in communication with a respective opening in the first cylinder, and a generally vertical portion in communication with the at least one opening in the second cylinder.

13. A flying insect trap comprising:
   a first, generally horizontally disposed tube defining a hollow, the tube having open first and second ends;
   a second, generally vertically disposed tube defining a hollow, the tube having an open first end in communication with the hollow of the first, generally horizontally disposed tube, and an open second end opposite the first end; and
   dividing means including a common wall disposed within the first, generally horizontally disposed tube and within the second, generally vertically disposed tube, so as to form at least two channels, each channel having a generally horizontal portion and a generally vertical portion, the generally vertical portions being disposed on opposing sides of the common wall.

14. The flying insect trap of claim 13, wherein the common wall comprises a continuous, vertically disposed wall.

15. The flying insect trap of claim 14 wherein the first, generally horizontally disposed tube, the second, generally vertically disposed tube, and the dividing means are formed of a single piece of material.

* * * * *